United States Patent
Roohparvar

(10) Patent No.: US 7,277,980 B2
(45) Date of Patent: *Oct. 2, 2007

(54) NON-CONTIGUOUS ADDRESS ERASABLE BLOCKS AND COMMAND IN FLASH MEMORY

(75) Inventor: Frankie Fariborz Roohparvar, Milpitas, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/190,466

(22) Filed: Jul. 27, 2005

(65) Prior Publication Data

US 2005/0286300 A1 Dec. 29, 2005

Related U.S. Application Data

(63) Continuation of application No. 10/224,913, filed on Aug. 21, 2002, now Pat. No. 6,941,411.

(51) Int. Cl.
*G06F 12/00* (2006.01)
(52) U.S. Cl. .................. 711/103; 711/115; 365/185.33
(58) Field of Classification Search ................ None
See application file for complete search history.

(56) References Cited

U.S. PATENT DOCUMENTS

| | | | |
|---|---|---|---|
| 5,033,023 A | 7/1991 | Hsia et al. | |
| 5,646,429 A | 7/1997 | Chevallier | |
| 5,673,224 A | 9/1997 | Chevallier et al. | |
| 5,687,117 A | 11/1997 | Chevallier et al. | |
| 5,793,087 A | 8/1998 | Chevallier | |
| 5,907,700 A * | 5/1999 | Talreja et al. | ................ 713/502 |
| 5,944,837 A * | 8/1999 | Talreja et al. | ................ 713/600 |
| 5,945,717 A | 8/1999 | Chevallier | |
| 5,959,884 A | 9/1999 | Chevallier et al. | |
| 6,034,897 A * | 3/2000 | Estakhri et al. | ......... 365/185.33 |
| 6,047,352 A | 4/2000 | Lakhani et al. | |
| 6,081,870 A | 6/2000 | Roohparvar | |
| 6,081,878 A * | 6/2000 | Estakhri et al. | ............. 711/168 |
| 6,097,632 A | 8/2000 | Roohparvar | |
| 6,104,638 A | 8/2000 | Larner et al. | |
| 6,202,138 B1 * | 3/2001 | Estakhri et al. | ............. 711/168 |
| 6,222,770 B1 | 4/2001 | Roohparvar | |
| 6,233,198 B1 | 5/2001 | Choi | |
| 6,272,052 B1 | 8/2001 | Miyauchi | |
| 6,288,941 B1 * | 9/2001 | Seki et al. | ............. 365/185.12 |
| 6,356,480 B1 * | 3/2002 | Sakakibara et al. | .... 365/185.22 |
| 6,381,174 B1 * | 4/2002 | Roohparvar et al. | ... 365/185.09 |

(Continued)

FOREIGN PATENT DOCUMENTS

| WO | WO 9912169 A1 * | 3/1999 |
|---|---|---|
| WO | WO9912169 A1 * | 3/1999 |

*Primary Examiner*—Kevin Verbrugge
(74) *Attorney, Agent, or Firm*—Leffert Jay & Polglaze, P.A.

(57) ABSTRACT

A non-volatile memory device includes a memory array having erasable blocks or memory cells. The array has pages that are not one continuous array row. As such, the array row is segmented into page rows. The page rows are addressed contiguously across the page and a main erase block is divided into sub-erase blocks that follow the page row segmentation.

19 Claims, 3 Drawing Sheets

U.S. PATENT DOCUMENTS

| | | |
|---|---|---|
| 6,397,314 B1 * | 5/2002 | Estakhri et al. ............. 711/168 |
| 6,407,941 B1 | 6/2002 | Chevallier et al. |
| 6,452,836 B1 | 9/2002 | Roohparvar |
| 6,466,484 B1 * | 10/2002 | Sakakibara et al. .... 365/185.29 |
| 6,490,202 B2 | 12/2002 | Roohparvar |
| 6,603,682 B2 * | 8/2003 | Keays ................... 365/185.33 |
| 6,614,695 B2 * | 9/2003 | Keays ................... 365/185.33 |
| 6,618,293 B2 * | 9/2003 | Keays ................... 365/185.29 |
| 6,618,294 B2 * | 9/2003 | Keays ................... 365/185.33 |
| 6,646,926 B2 * | 11/2003 | Keays ................... 365/185.29 |
| 6,646,927 B2 * | 11/2003 | Keays ................... 365/185.33 |
| 6,650,571 B2 * | 11/2003 | Keays ................... 365/185.33 |
| 6,654,292 B2 * | 11/2003 | Keays ................... 365/185.33 |
| 6,728,851 B1 * | 4/2004 | Estakhri et al. ............. 711/168 |
| 6,748,482 B1 | 6/2004 | Fackenthal |
| 6,757,800 B1 * | 6/2004 | Estakhri et al. ............. 711/168 |
| 2002/0035661 A1 | 3/2002 | Roohparvar |
| 2002/0126539 A1 | 9/2002 | Roohparvar |
| 2002/0157048 A1 | 10/2002 | Roohparvar |
| 2003/0039145 A1 * | 2/2003 | Keays ................... 365/185.33 |
| 2003/0067810 A1 * | 4/2003 | Keays ................... 365/185.33 |
| 2003/0067811 A1 * | 4/2003 | Keays ................... 365/185.33 |
| 2003/0072179 A1 * | 4/2003 | Keays ................... 365/185.33 |
| 2003/0072180 A1 * | 4/2003 | Keays ................... 365/185.33 |
| 2003/0072181 A1 * | 4/2003 | Keays ................... 365/185.33 |
| 2003/0072182 A1 * | 4/2003 | Keays ................... 365/185.33 |
| 2004/0199714 A1 * | 10/2004 | Estakhri et al. ............. 711/103 |
| 2005/0125595 A1 * | 6/2005 | Takeuchi et al. ............ 711/103 |

* cited by examiner

NON-CONTIGUOUS ADDRESS ERASABLE BLOCKS AND COMMAND IN FLASH MEMORY

RELATED APPLICATION

This Application is a Continuation of U.S. application Ser. No. 10/224,913, titled "NON-CONTIGUOUS ADDRESS ERASABLE BLOCKS AND COMMAND IN FLASH MEMORY," filed Aug. 21, 2002, now U.S. Pat. No. 6,941,411 which is commonly assigned and incorporated herein by reference.

FIELD OF THE INVENTION

The present invention relates generally to memory devices and in particular the present invention relates to erase operations in a non-volatile memory device.

BACKGROUND OF THE INVENTION

A Flash memory is a type of memory that can be erased and reprogrammed in blocks instead of one byte at a time. A typical Flash memory comprises a memory includes a floating gate field-effect transistor capable of holding a charge. The cells are usually grouped into blocks. Each of the cells within a block can be electrically programmed in a random basis by charging the floating gate. The charge can be removed from the floating gate by a block erase operation. The data in a cell is determined by the presence or absence of the charge in the floating gate.

Similarly, random access memory devices have memory cells that are typically arranged in an array of rows and columns. During operation, a row (page) is accessed and then memory cells can be randomly accessed on the page by providing column addresses. This access mode is referred to as page mode access. To read or write to multiple column locations on a page requires the external application of multiple column addresses.

A synchronous DRAM (SDRAM) is a type of DRAM that can run at much higher clock speeds than conventional DRAM memory. While SDRAM's can be accessed quickly, they are volatile. Many computer systems are designed to operate using SDRAM, but would benefit from non-volatile memory. A synchronous Flash memory has been designed that allows for a non-volatile memory device with an SDRAM interface. In general, the goal of synchronous Flash is to mimic the architecture of SDRAM and reside on the same bus as an SDRAM. Some problems result from keeping consistent with SDRAM addressing while maintaining features that are important to Flash memory. One such feature is the Erasable block size of the flash. Flash memory can be programmed on byte or word basis, however, the memory cell erase is done to an entire block of memory at one time.

For the reasons stated above, and for other reasons stated below which will become apparent to those skilled in the art upon reading and understanding the present specification, there is a need in the art for a non-volatile memory with different erase block architectures.

SUMMARY OF THE INVENTION

The above-mentioned problems with non-volatile memory devices and other problems are addressed by the present invention and will be understood by reading and studying the following specification.

In one embodiment, a non-volatile memory device comprises an array of non-volatile memory cells arranged in rows and columns, and erase circuitry coupled to selectively erase either a main erase block of the array or an erase sub-block of the array. The main erase block comprises rows of the memory array that cross all of the array columns. The erase sub-block comprises rows of the memory array that cross only a portion of the array columns.

In another embodiment, a flash memory comprises an array of non-volatile memory cells arranged in X rows and Y columns, wherein the X rows have Z segments each comprising Y/Z columns. Erase circuitry is coupled to selectively erase either a main erase block of the array or an erase sub-block of the array. The main erase block comprises Z segments crossing Y columns, and the erase sub-block comprises one segment crossing Y/Z columns.

A method of operating a flash memory comprises selecting a first erase block in response to a first externally provided command, performing an erase operation on the first erase block, and selecting a second erase block in response to a second externally provided command. The second erase block comprises a portion of the first erase block. An erase operation is performed on the second erase block. The memory can comprise an array of non-volatile memory cells arranged in X rows addressed from $X_1$ to $X_A$ and Y columns addressed from $Y_1$ to $Y_B$, and the X rows are divided into N segments. The first erase block comprises row addresses $X_1$ to $X_A$ and columns addresses $Y_1$ to $Y_B$. The second erase block comprises row addresses $X_1$ to $X_A$ and columns addresses $Y_1$ to $Y_{B/N}$.

DETAILED DESCRIPTION OF THE DRAWINGS

In the following detailed description of the preferred embodiments, reference is made to the accompanying drawings, which form a part hereof, and in which is shown by way of illustration specific preferred embodiments in which the inventions may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense, and the scope of the present invention is defined only by the claims.

Figure 1:
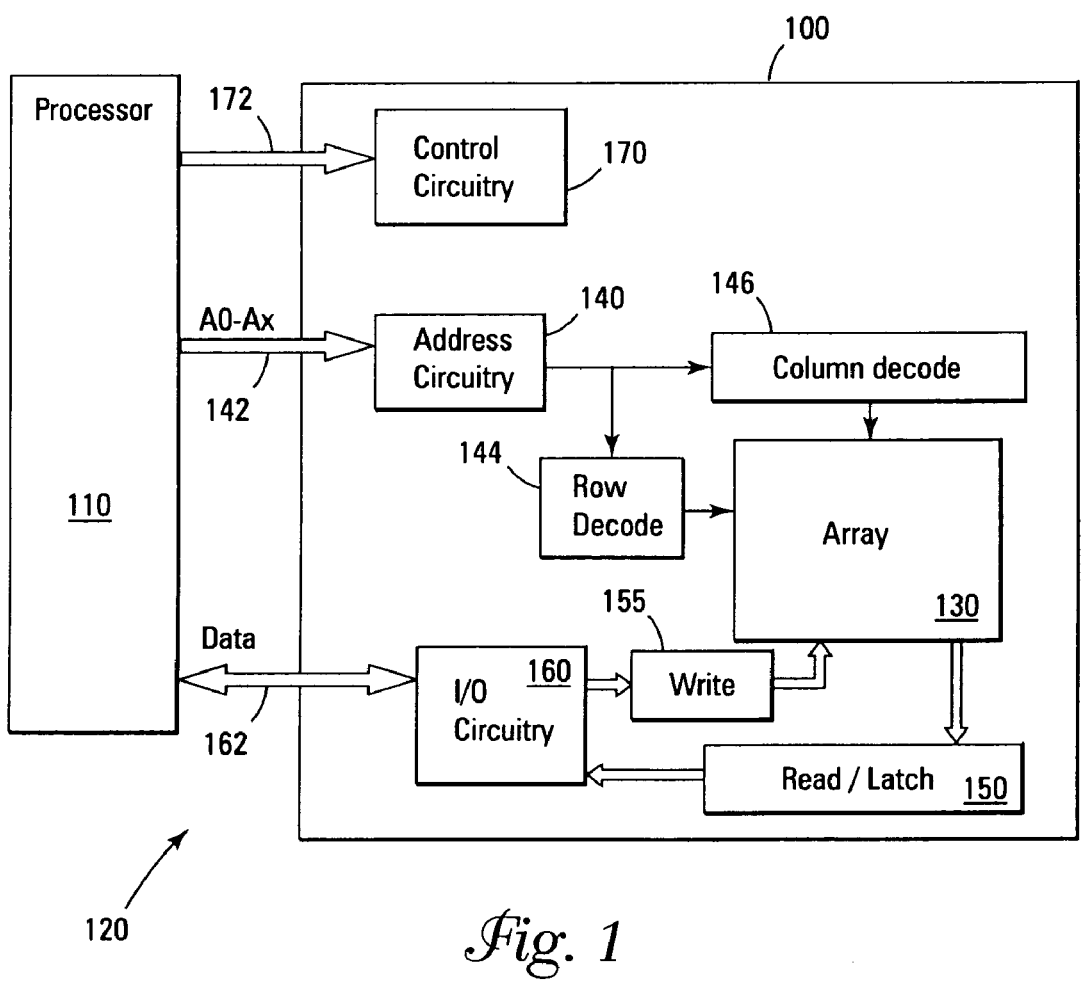
FIG. 1 is a functional block diagram of a memory device of one embodiment of the present invention.

FIG. 1 is a functional block diagram of a memory device 100, of one embodiment of the present invention, that is coupled to a processor 110. The memory device 100 and the processor 110 may form part of an electronic system 120. The memory device 100 has been simplified to focus on features of the memory that are helpful in understanding the present invention. The memory device includes an array of memory cells 130. The memory cells are preferably non-volatile floating-gate memory cells and generally have their control gates coupled to word lines, drain regions coupled to local bit lines, and source regions commonly coupled to a ground potential. The memory array 130 is arranged in banks of rows and columns. Each bank is arranged in erase blocks. During an erase operation, the memory cells of the erase block are placed in an erased state. Data, however, may be stored in the memory array 130 separate from the block structure.

An address buffer circuit 140 is provided to latch address signals provided on address input connections A0-Ax 142. Address signals are received and decoded by row decoder 144 and a column decoder 146 to access the memory array 130. It will be appreciated by those skilled in the art, with the benefit of the present description, that the number of address input connections depend upon the density and architecture of the memory array. That is, the number of addresses increases with both increased memory cell counts and increased bank and block counts.

The non-volatile memory cells are fabricated as floating gate memory cells and include a source region and a drain region that is spaced apart from the source region to form an intermediate channel region. A floating gate, typically made of doped polysilicon, is disposed over the channel region and is electrically isolated from the other cell elements by oxide. For example, gate oxide can be formed between the floating gate and the channel region. A control gate is located over the floating gate and is can also made of doped polysilicon. The control gate is electrically separated from the floating gate by another dielectric layer. Thus, the floating gate is "floating" in dielectric so that it is insulated from both the channel and the control gate.

The memory cell is programmed using hot electron injection in the channel region near the drain region of the memory cell. These high-energy electrons travel through the gate oxide towards the positive voltage present on the control gate and collect on the floating gate. These electrons remain on the floating gate and function to reduce the effective threshold voltage of the cell as compared to a cell that has not been programmed.

To read a memory cell a control gate voltage Vg is connected to the primary supply voltage VCC of +5 volts. In addition, the drain voltage Vd is set to a small positive voltage of +1 volts and the source voltage Vs is set to ground potential. If the cell were in a programmed state, the excess electrons present on the floating gate would have increased the threshold voltage to a value in excess of +5 volts. Thus, the control gate Vg to source voltage Vs of +5 volts would not be sufficient to turn on the memory cell. That is, current would not be conducted through the channel region. The resultant lack of cell current indicates that the memory cell was in a programmed state. If the memory cell were in an erased state, the threshold voltage of the cell would be substantially below +5 volts. In that case, the cell would conduct current in response to the control gate voltage that would be sensed to indicate that the cell was in the erased state.

Two conventional alternative sets of conditions for erasing a flash cell are commonly used. In the first method, the control gate voltage Vg is grounded and the drain region is left floating (open), and the source region voltage Vs is connected to a large positive voltage of +12 volts. When these conditions are applied to the cell, a strong electric field is generated between the floating gate and the source region. This field causes the electrons on the floating gate to be transferred to the source region by way of Fowler-Nordheim tunneling.

The above conditions for erasing a cell can be disadvantageous in that the large positive voltage (+12 volts) applied to the source region is difficult to implement in an actual memory system. In another approach, a relatively large negative voltage ranging from −10 to −17 volts is applied to the gate during an erase operation. In addition, the primary supply voltage VCC of +5 volts (or less) is applied to the source region while the drain region is left floating.

The program and erase operations are not performed in single steps. That is, successive program pulses are applied to the memory cells to program a memory cell. This approach reduces over-programming. In a similar manner, the erase operation is iterative. In one embodiment, the erase operation includes three primary steps. The first is a pre-program operation in which all of the memory cells of an erase block are programmed. After all of the cells are pre-programmed, successive erase pulses are applied to the memory cells to remove the pre-program charge from the floating gate. A soft-program operation can be performed to 'heal' any over-erased memory cells.

The memory device reads data in the array 130 by sensing voltage changes in the memory array columns using read/latch circuitry 150. The read/latch circuitry, in one embodiment, is coupled to read and latch a row of data from the memory array. The row data can be one continuous address, or comprised of partial rows of discontinuous addresses.

Data input and output buffer circuitry 160 is included for bi-directional data communication over a plurality of data (DQ) connections 162 with the processor 110. The timing of data communication can vary depending upon the architecture. In one embodiment, data read from the memory can be output on the data connections with read latency. Read latency, as known to those skilled in the art, is the number of clock cycles between a read command and available data on the output connections. In addition, the memory can operate in a burst mode and allows read-while-write capabilities to different array banks.

Command control circuit 170 decodes signals provided on control connections 172 from the processor 110. These signals are used to control the operations on the memory array 130, including data read, data write, and erase operations. During operation, commands are provided on the control connections, such as ACTIVE, READ and WRITE commands. An ACTIVE command is used to open (or activate) a row in a particular array bank for a subsequent access. A selected row generally remains active for accesses until the next ACTIVE command. The READ command is used to initiate a read access to an active row. The address connections are used to select a starting column location. Read data appears on the DQs subject to a read latency value. A WRITE command is used to initiate a single-location write access on an active row. Input data appearing on the DQs is written to the memory array. Input data appearing on the DQs is written to the memory array by write circuitry 155. The flash memory device has been simplified to facilitate a basic understanding of the features of the memory. A more detailed understanding of internal circuitry and functions of flash memories are known to those skilled in the art.

Figure 2:
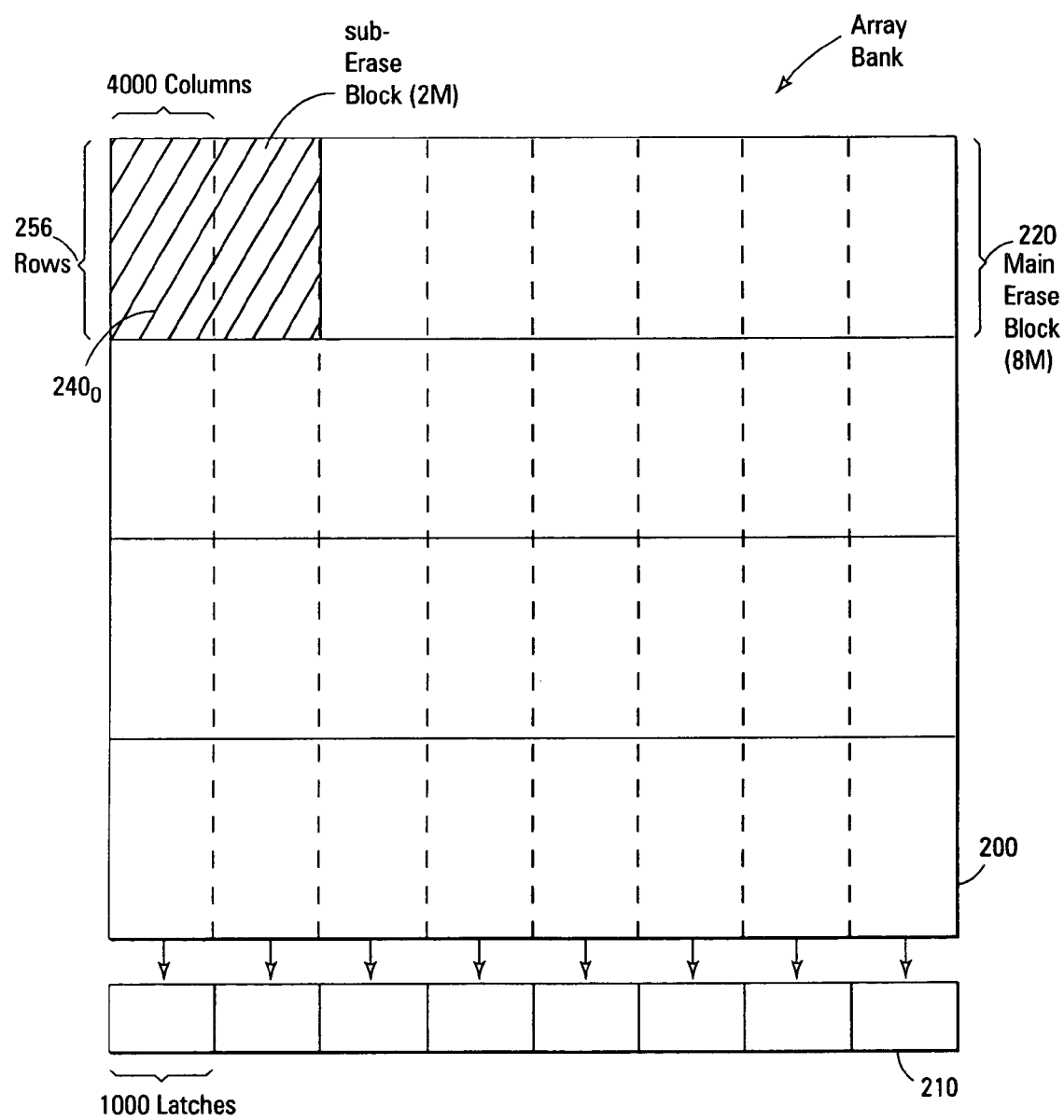
FIG. 2 illustrates a memory array erase block architecture of an embodiment of the memory of FIG. 1.

One example embodiment of the memory of FIG. 1 is a 128 Meg synchronous flash memory that operates with an open page having a length of 8000 bits, see FIG. 2. As such, 8000 bits of data are sensed at one time using sense amplifier circuits coupled to the memory array 200. The sensed data is then latched in corresponding latches 210. With all 8000 bits residing on one row line, the sense amplifiers need to be fabricated against the pitch of the memory cell. The memory cells are designed, or drawn, at very aggressive design rules since they determine the size of the memory array. Drawing devices or transistors against that pitch is usually very difficult. As such, a sense amplifier is drawn in a pitch of 4 cells for better space utilization. With all the above constraints, the total number of bits on a memory row is about 32K bits (8000 sense amplifiers). It is practically impossible, with current technology, to draw a row line that is 32K bits long. In practice, the array is drawn in physical sections. In one embodiment, the memory array is designed in four sections. Thus, the row lines are broken into four separate sections and each having 2K sense amplifiers drawn against them.

The memory rows are part of a main Erasable block 220 of 256 rows. So the total number of bits in a main Erasable block is 8M bits. This is very large for some software applications, however, a smaller Erasable block size could make the efficiency of the die very bad and hence cost inefficient.

Figure 3:
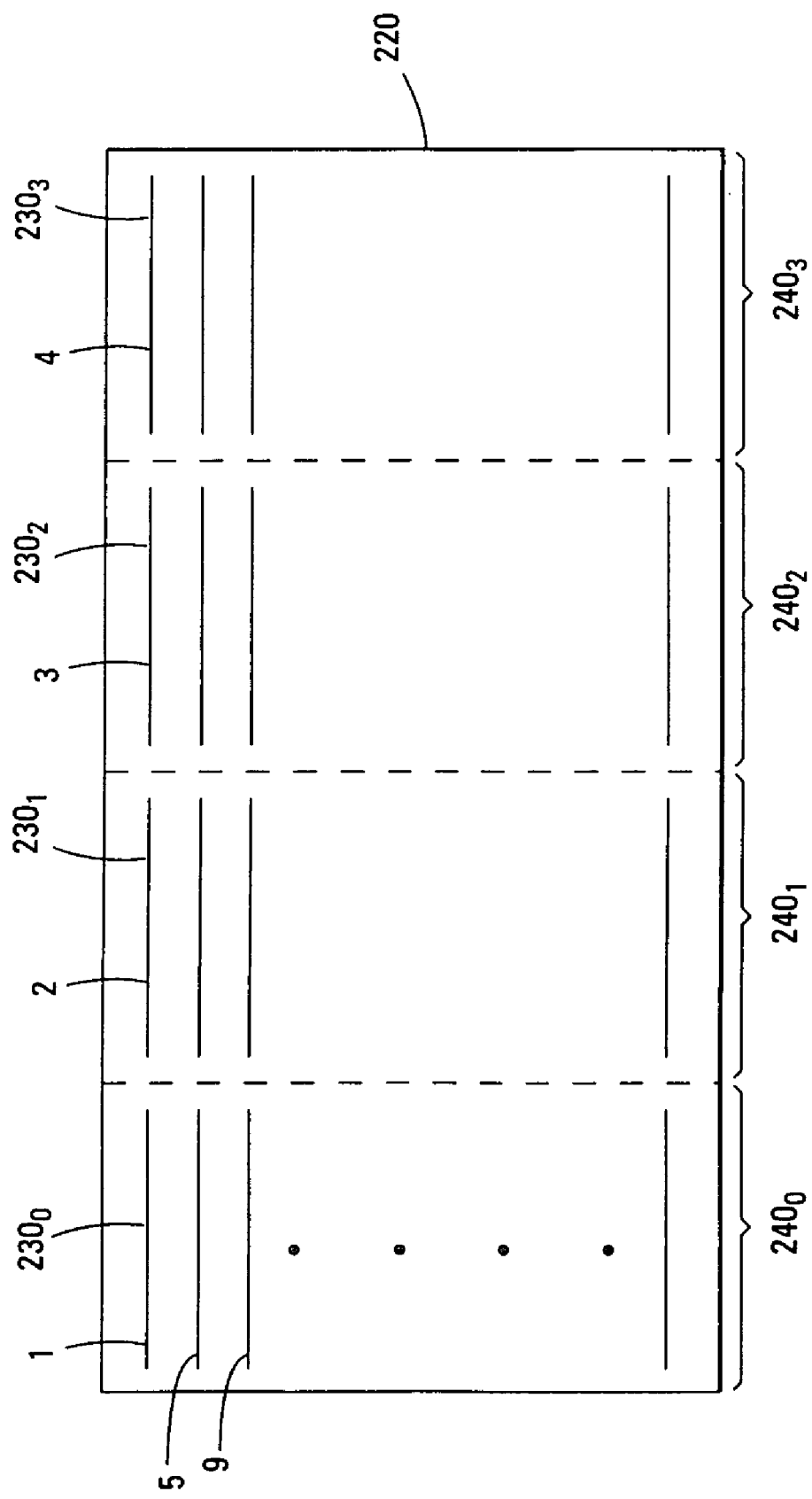
FIG. 3 is a more detailed illustration of a main erasable block of the memory of FIG. 1.

One embodiment of the present invention arranges the erasure of the blocks based on their physical locality. Referring to FIG. 3, a more detailed description of one main erasable block 220 is provided. The main block includes 8M memory cells. The cells are arranged in 32 k columns and 256 page rows. The page rows, however, are not one continuous row. That is, signal propagation delays due to line capacitance prohibit a single row for 32 k columns. The array row is segmented into four page rows $230_0$-$230_3$ each corresponding to 8 k columns. The page rows are addressed contiguously across the page. For example, the rows start at address 1 and continue to row 4 across one page row, the next page row begins with row 5.

Each 2M section of the main block form a sub-erase block $240_0$-$240_3$, as described above. The sub-erase block has 256 rows that do not have contiguous row addresses. Code data is typically stored in the flash memory using contiguous addresses. During operation, the main block is erased and then the code is stored in the memory array in a continuous manner that crosses one or more sub-erase blocks $240_0$-$240_3$. When the code is replaced, the entire main block is erased.

Erasing 8M memory cells is time and power consuming. For some applications of the flash memory, such as data storage for cellular telephones, the need for large contiguous data storage is less important than speed and power consumption. As such, the present invention allows a user to designate the erase block size. The main block is divided into sub-erase blocks to follow the page row segmentation. In the above example, the main 8M erase block is divided into four 2M sub-erase blocks $240_0$-$240_3$.

If the user is able to write and read data from non-contiguous rows, a sub-erase block can be designated using externally provided commands. In one embodiment, an external command initiates an erase operation and designates a main erase block 220, or a sub-erase block 240.

A prior art erase command sequence for a flash block erase is a load command register (LCR) code of 20H, followed by an active cycle that provides the block address and furthermore followed by a write cycle with Data=D0H. The block address is a subset of the address connections available.

Because the blocks are divided into sub-blocks in embodiments of the present invention, there is a larger subset of the address connections used in the active cycle to decode the sub-block. A new LCR code of 4FH, for example, followed by active and write cycles are used to erase a sub-block of an embodiment the present invention. The LCR code can be any code that is not another valid command and is not limited to 4FH.

CONCLUSION

A non-volatile memory device has been described that includes a memory array having erasable blocks or memory cells. One embodiment of the memory arranges the erasure of the blocks based on their physical locality. The array has pages that are not one continuous array row. That is, signal propagation delays due to line capacitance prohibit a single long row. As such, the array row is segmented into page rows. The page rows are addressed contiguously across the page and a main erase block is divided into sub-erase blocks that follow the page row segmentation.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A non-volatile memory device, comprising:
   a single array of non-volatile memory cells having a plurality of rows and columns arranged in erase blocks, wherein each erase block contains two or more erase sub-blocks;
   wherein each erase block comprises a plurality of rows of the memory array that cross all of the array columns, and where each erase sub-block comprises a plurality of rows of the memory array that cross only a selected number of the array columns;
   wherein the non-volatile memory device is adapted to selectively erase either an erase block of the array or a single erase sub-block of an erase block of the array; and
   wherein each erase block comprises rows having contiguous memory cell location addresses, and each erase sub-block comprises rows having non-contiguous memory cell location addresses.

2. The non-volatile memory device of claim 1, wherein the non-volatile memory is adapted to erase a selected erase block by one of erasing the full erase block and sequentially erasing each of the two or more erase sub-blocks of the selected erase block.

3. A non-volatile memory array, comprising:
   a plurality of non-volatile memory cells in a single non-volatile memory array arranged in X rows and Y columns, wherein the X rows have Z segments each comprising Y/Z columns and where the plurality of non-volatile memory cells of the array are further arranged in a plurality of erase blocks, each erase block containing two or more erase sub-blocks;
   wherein each erase block comprises Z segments crossing Y columns, and wherein each erase sub-block comprises one segment crossing Y/Z columns;
   wherein each memory cell has a location address, and where the location addresses of the memory cells located in a single row of the array rows are contiguous across the Y columns; and
   wherein the non-volatile memory array is adapted to selectively erase either a selected erase block or a single erase sub-block of an erase block of the array.

4. The non-volatile memory array of claim 3, wherein each erase block or erase sub-block contains a plurality of rows of the array.

5. The non-volatile memory array of claim 3, wherein each erase block comprises X/N rows.

6. A method of erasing a non-volatile memory comprising:
selecting either an erase block or a single erase sub-block of an erase block wherein each erase block contains two or more erase sub-blocks, where each erase block comprises a plurality of rows of a single non-volatile memory array that cross all of the array columns, and where each erase sub-block comprises a plurality of rows of the memory array that cross only a selected number of the array columns such that each erase block comprises consecutively addressed memory cells and each erase sub-block comprises non-consecutively addressed memory cells; and
erasing the selected erase block or the single erase sub-block.

7. The method of claim 6, wherein selecting and erasing either the erase block or the erase sub-block further comprises selecting and erasing either the erase block or the erase sub-block in response to externally provided commands.

8. The method of claim 6, wherein selecting and erasing either the erase block or the erase sub-block further comprises selecting and erasing either the erase block or the erase sub-block, wherein the memory comprises an array of non-volatile memory cells arranged in X rows and Y columns, where the X rows have Z segments each comprising Y/Z columns and where each erase block comprises X/N rows and Y columns and each erase sub-block comprises X/N rows and a segment of Y/Z columns.

9. The method of claim 6, wherein erasing the selected erase block further comprises sequentially erasing each of the two or more erase sub-blocks of the selected erase block.

10. A method of operating an electronic system, comprising:
storing data on a non-volatile memory device with a processor, wherein a single array of the non-volatile memory device contains a plurality of non-volatile memory cells having a plurality of rows and columns arranged in erase blocks, where each erase block contains two or more erase sub-blocks, and where each erase block contains memory cells that are contiguously addressed across all the columns of sequentially addressed rows of the array and each erase sub-block contains memory cells that are non-contiguously addressed across only a selected number of columns of sequentially addressed rows of the array; and erasing the data stored in a single non-contiguously addressed erase sub-block on the non-volatile memory device with the processor.

11. The method of claim 10, further comprising sequentially erasing data stored in one or more non-contiguously addressed erase sub-blocks on the non-volatile memory device with the processor.

12. The method of claim 11, further comprising erasing data stored in one or more contiguously addressed erase blocks on the non-volatile memory device with the processor.

13. The method of claim 10, further comprising accessing the data stored on two or more rows of a single non-contiguously addressed sub-erase block of the non-volatile memory device with the processor.

14. The method of claim 10, wherein storing data on a non-volatile memory device with a processor further comprises storing data on two or more rows of a single non-contiguously addressed sub-erase block of the non-volatile memory device with the processor.

15. The method of claim 10, wherein the array of non-volatile memory cells is arranged in X rows and Y columns, where the X rows have Z segments each comprising Y/Z columns and where each erase block comprises X/N rows and Y columns and each erase sub-block comprises X/N rows and a segment of Y/Z columns.

16. A electronic system comprising:
a processor; and
a non-volatile memory device coupled to communicate with the processor and comprising,
a single array of non-volatile memory cells arranged in rows and columns and is further arranged in a plurality of main erase blocks and a plurality of erase sub-blocks, and
wherein the non-volatile memory device is adapted to selectively erase either a main erase block or a single erase sub-block of an erase block in response to the processor, wherein each main erase block comprises a plurality of contiguously addressed memory cells that cross all columns of a plurality of sequentially addressed rows of the array, and wherein each erase sub-block comprises a plurality of non-contiguously addressed memory cells that cross only a selected set of columns of a plurality of sequentially addressed rows of the array.

17. The electronic system of claim 16, wherein the processor is adapted to store, access, and erase data that is stored across one or more non-contiguously addressed erase sub-blocks of a main erase block.

18. The electronic system of claim 16, wherein the processor is adapted to store, access, and erase data from one or more contiguously addressed main erase blocks.

19. The electronic system of claim 16, wherein the addresses of the memory cells located in a single row of the array rows are contiguous.

* * * * *